United States Patent
Venetianer et al.

(10) Patent No.: US 11,792,501 B2
(45) Date of Patent: Oct. 17, 2023

(54) DEVICE, METHOD AND SYSTEM FOR INSTALLING VIDEO ANALYTICS PARAMETERS AT A VIDEO ANALYTICS ENGINE

(71) Applicant: MOTOROLA SOLUTIONS, INC., Chicago, IL (US)

(72) Inventors: Peter L. Venetianer, Chicago, IL (US); Thomas Christopher Hansen, Vancouver (CA); Qifan Liang, Chicago, IL (US); Ryan Lee, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/125,442

(22) Filed: Dec. 17, 2020

(65) Prior Publication Data

US 2022/0201202 A1 Jun. 23, 2022

(51) Int. Cl.
*H04N 7/18* (2006.01)
*H04N 23/617* (2023.01)
*G06F 18/2431* (2023.01)

(52) U.S. Cl.
CPC ....... *H04N 23/617* (2023.01); *G06F 18/2431* (2023.01); *H04N 7/18* (2013.01)

(58) Field of Classification Search
CPC ....... H04N 5/23225; H04N 7/18; G06K 9/628
USPC ............... 348/159, 211.11; 382/305
See application file for complete search history.

(56) References Cited

U.S. PATENT DOCUMENTS

| | | |
|---|---|---|
| 9,710,729 B2 | 7/2017 | Chidlovskii et al. |
| 2011/0109742 A1 | 5/2011 | Laganiere et al. |
| 2014/0085480 A1 | 3/2014 | Saptharishi |
| 2016/0078339 A1 | 3/2016 | Li et al. |
| 2017/0019585 A1 | 1/2017 | Lytle |
| 2017/0270689 A1* | 9/2017 | Messely ............ H04N 5/23293 |
| 2018/0330238 A1 | 11/2018 | Luciw et al. |
| 2019/0068882 A1* | 2/2019 | Mok .................. H04N 5/23245 |
| 2019/0288911 A1* | 9/2019 | Amini ..................... H04L 43/08 |
| 2019/0306408 A1* | 10/2019 | Hofer ....................... G06T 7/80 |

(Continued)

FOREIGN PATENT DOCUMENTS

| | | |
|---|---|---|
| WO | 2016037359 A1 | 3/2016 |
| WO | WO-2016037350 A1 | 3/2016 |

OTHER PUBLICATIONS

PCT/US2021/058719, Device, Method and System For Installing Video Analytics Parameters at a Video Analytics Engine, Nov. 10, 2021.

(Continued)

*Primary Examiner* — Thai Q Tran
*Assistant Examiner* — Stephen R Smith
(74) *Attorney, Agent, or Firm* — PERRY + CURRIER, INC.

(57) ABSTRACT

A device, method and system for installing video analytics parameters at a video analytics engine is provided. An example device determines that a classification of a first camera is one or more of similar to, and same as, a respective classification of at least one second camera. The example device retrieves, from a memory, video analytics parameters associated with the at least one second camera, the video analytics parameters stored at the memory in association with the respective classification. The example device causes installing of the video analytics parameters at a video analytics engine associated with the first camera.

16 Claims, 5 Drawing Sheets

(56) References Cited

U.S. PATENT DOCUMENTS

| | | | |
|---|---|---|---|
| 2020/0275016 A1* | 8/2020 | Citerin | H04N 5/23216 |
| 2021/0012095 A1* | 1/2021 | Shimada | H04N 7/18 |
| 2021/0192253 A1* | 6/2021 | Kojima | H04N 7/181 |
| 2021/0195089 A1* | 6/2021 | Kojima | G06K 9/00771 |
| 2022/0060624 A1* | 2/2022 | Calvert | G06V 20/41 |

OTHER PUBLICATIONS

Konecny, Jakub, et al., "Federated Learning: Strategies for Improving Communication Efficiency", downloaded from https://arxiv.org/pdf/1610.05492.pdf; Published Oct. 30, 2017.

Pasandi, Hannaneh Barahouei, et al., "Collaborative Intelligent Cross-Camera Video Analytics at Edge: Opportunities and Challenges", pp. 1-4, downloaded from https://arxiv.org/ftp/arxiv/papers/1909/1909.10468.pdf; Published Sep. 23, 2019.

Pasandi, Hannaneh Barahouei, et al., "Convince: Collaborative Cross-Camera Video Analytics at the Edge", pp. 1-6, downloaded from https://arxiv.org/pdf/2002.03797.pdf; Published Feb. 5, 2020.

Jiang, Junchen, et al., "Chameleon: Scalable Adaptation of Video Analytics", pp. 1-14, SIGCOMM '18, Aug. 20-25, 2018, Budapest,Hungary,downloaded from https://people.cs.uchicago.edu/~junchenj/docs/Chameleon_SIGCOMM_CameraReady_faceblurred.pdf.

\* cited by examiner

DEVICE, METHOD AND SYSTEM FOR INSTALLING VIDEO ANALYTICS PARAMETERS AT A VIDEO ANALYTICS ENGINE

BACKGROUND OF THE INVENTION

Video analytics installed at a site with a camera may be out-of-the-box and/or turnkey, and the like and hence are generally configured to handle a number of "typical" scenarios (e.g. lacking atypical aspects) using out-of-the-box parameters for indoor video analytics or outdoor video analytics, and/or daytime video analytics or nighttime video analytics, and the like. While some video analytics installed at a site may continue to improve based on the specific site (e.g. implementing site-specific learning over time), such learning is local and applies only to an individual camera at the site, starting from a baseline at a time of installation.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Video analytics installed at a site with a camera may be out-of-the-box and/or turnkey, and the like and hence are generally configured to handle a number of "typical" scenarios (e.g. lacking atypical aspects) using out-of-the-box parameters for indoor video analytics or outdoor video analytics, and/or daytime video analytics or nighttime video analytics, and the like. While some video analytics at a site may continue to improve based on the specific site (e.g. implementing site-specific learning over time), such learning is local and applies only to an individual camera at the site, starting from a baseline at a time of installation. Thus, there exists a need for an improved technical method, device, and system for installing video analytics parameters at a video analytics engine.

Hence, provided herein is a computing device which may be in communication with a plurality of cameras and video analytics engines associated with the cameras; the video analytics engines may comprise a combination of hardware and software which may be located at, or in, the cameras and/or in another appliance and/or device which may be local to, or remote from (e.g. in the cloud), the cameras. A video analytics engine associated with a camera may further be distributed among a plurality of devices and the like. The cameras may be classified with respect to a type of scene and/or view and/or site imaged by the cameras (and which may include classifications associated with day, night, weather, among other possibilities); such classifications will be referred to hereafter as scene classifications. For example, one subset of the cameras may be imaging parking lots outdoors, while another subset of the cameras may be imaging hallways indoors. Hence, the cameras may be "scene" classified, for example at a time of installation, by an installer selecting a scene classification at a camera, and/or by a respective video analytics engine associated with the camera, and/or the cameras may be scene classified automatically based on images acquired by the camera, for example at a respective video analytics engine and/or by the computing device. Regardless, of where and/or how the scene classification of a camera occurs, the computing device is understood to have access to such a scene classification.

The video analytics engines associated with the cameras may initially be set up to analyze images using an initial set of "out of the box" video analytics parameters provided at installation, for example which may be used to identify and/or classify objects in the images, among other possibilities, which may be referred to as object classification. Object classification is understood to be different from scene classification, though scene classification may be based, at least in part, on objects classified in images from a camera. Over time, video analytics engines may "learn" new video analytics parameters associated with object classification, and the like, and/or refine video analytics parameters, for example using teach-by-example techniques and/or feedback. Such feedback may include, but is not limited to, a user of a given camera and/or a video analytics engine providing manual feedback to assist a video analytics engine to learn to recognize new and/or different objects, and/or to generate new classifiers, and/or to correct and/or reduce false positives, and the like. Such new and/or refined video analytics parameters for object classification, and the like may be available to the computing device as stored in association with a respective scene classification of an associated camera.

When a new camera and associated video analytics engine is installed, the new camera and/or the associated video analytics engine may register with the computing device. The computing device may determine, and/or have access to, a scene classification of the new camera, and the computing device may cause existing video analytics parameters associated with the scene classification to be installed at the video analytics engine. The computing device may also maintain and/or share similar sets of video analytics parameters across cameras and respective video analytics engines having a same and/or similar scene classification, so that, as new and/or refined video analytics parameters are generated at one camera and/or a respective video analytics engine, such new and/or refined video analytics parameters are distributed to other cameras of a same and/or similar scene classification.

An aspect of the present specification provides a method comprising: determining, at a computing device, that a classification of a first camera is one or more of similar to, and same as, a respective classification of at least one second camera; retrieving, at the computing device, from a memory, video analytics parameters associated with the at least one second camera, the video analytics parameters stored at the memory in association with the respective classification; and causing installing, via the computing device, of the video analytics parameters at a video analytics engine associated with the first camera.

Another aspect of the present specification provides a device comprising: a controller configured to: determine that a classification of a first camera is one or more of similar to, and same as, a respective classification of at least one second camera; retrieve, from a memory, video analytics parameters associated with the at least one second camera, the video analytics parameters stored at the memory in association with the respective classification; and cause installing of the video analytics parameters at a video analytics engine associated with the first camera.

Each of the above-mentioned aspects will be discussed in more detail below, starting with example system and device architectures of the system in which the embodiments may be practiced, followed by an illustration of processing blocks for achieving an improved technical method, device, and system for installing video analytics parameters at a video analytics engine.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Figure 1:
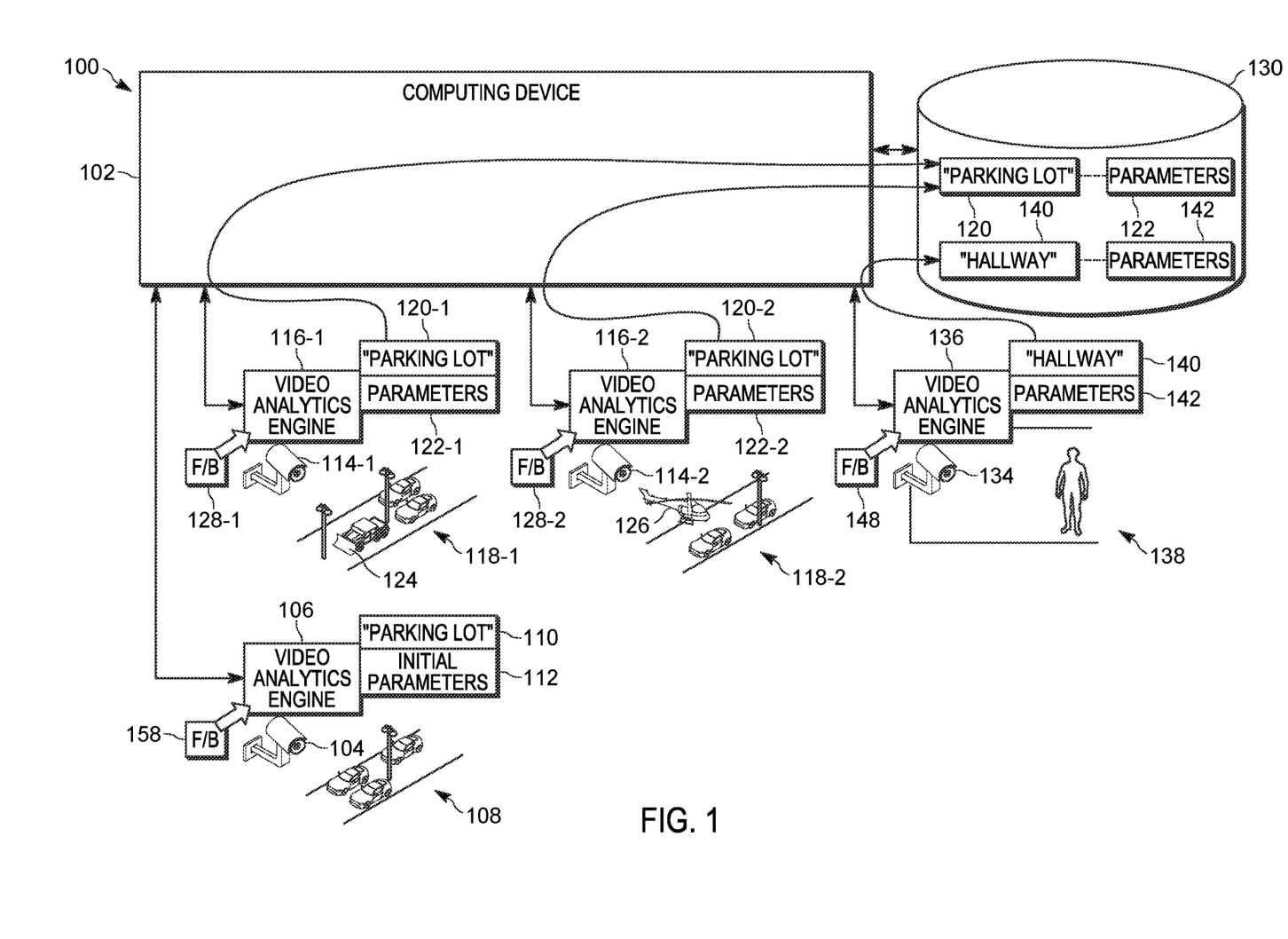
FIG. 1 is a system for installing video analytics parameters at a video analytics engine, in accordance with some examples.

Attention is directed to FIG. 1, which depicts an example system 100 for installing video analytics parameters at a video analytics engine. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as video analytics engines, which may be understood to refer to hardware, and/or a combination of hardware and software (e.g. a combination of hardware and software includes software hosted at hardware, such as a software module that is stored at a processor-readable memory implemented or interpreted by a processor), or hardware and software hosted at hardware and/or implemented as a system-on-chip architecture and the like.

The system 100 comprises a computing device 102 which is in communication with a first camera 104, and a video analytics engine 106 associated with the first camera 104. The first camera 104 is understood to be in a fixed location, for example mounted to a wall and/or pole, and the like, and may have a fixed field-of-view, or may be configured to pan, track, zoom (e.g. PTZ functionality) and the like at the fixed location. Regardless, the first camera 104 is understood to be imaging a same view and/or a same plurality of views at a given site 108.

While as depicted the video analytics engine 106 is incorporated with the first camera 104 (e.g. in a system-on-chip architecture), and/or co-located with the first camera 104 (e.g. as a separate device and/or appliance), in other examples, the video analytics engine 106 may be separate from the first camera 104 and/or remote from the first camera 104. For example, the video analytics engine 106 may be hosted at the computing device 102 and/or a cloud computing device and/or more than one cloud computing device (e.g. the functionally of the video analytics engine 106 may be distributed between more than one cloud computing device and the like and/or more than appliance). Regardless, the first camera 104 and the video analytics engine 106 may be a new installation at the given site 108 which, as depicted, comprises a parking lot.

Hence, at installation, an installer (not depicted) may use an input (e.g. an hardware input such as a touch screen display used to operate a menu system, and the like) of the first camera 104 and/or the video analytics engine 106 to store a scene classification 110 of "Parking Lot" (e.g. as depicted) at the first camera 104 and/or the video analytics engine 106, for example as a setting at one or more of the first camera 104 and the video analytics engine 106. Alternatively, the video analytics engine 106 may be configured to classify images from the camera 104 according to a scene imaged by the camera 104 in an initial set-up process, and the like. In a particular example, the video analytics engine 106 may include factory installed machine learning classifiers that machine learning algorithms at the video analytics engine 106 may use to classify images for different types of scenes of sites at which cameras are "typically" installed, such as parking lots, hallways, malls, roadways, doors of businesses and/or private residences, and/or any other suitable site. It is understood that a scene classification, as provided herein, may include, but is not limited to, a category associated with a camera based on a type of site at which the camera is installed.

The first camera 104 and/or the video analytics engine 106 may provide the scene classification 110 to the computing device 102 in a registration process, for example, when the first camera 104 and/or the video analytics engine 106 is first turned on, and the like. In a particular example, when the video analytics engine 106 is located at the first camera 104, the first camera 104 and/or video analytics engine 106 may determine the scene classification 110 based on images that have not been transmitted out of the first camera 104, for example in an initial set-up process.

Alternatively, the images from the first camera 104 may be provided to the computing device 102 which may perform such a classification. Hence, regardless of where performed, determining the scene classification 110 may, in some examples, be based on images received from the first camera 104.

Hence, as previously mentioned, determination of the scene classification 110 may occur at the first camera 104 and/or the video analytics engine 106 associated with the first camera 104, and/or at the computing device 102, for example based on images received from the first camera 104, and/or at any other suitable device and/or appliance including, but not limited to, at one or more cloud computing devices hosting the video analytics engine 106.

While the scene classification 110 is described with respect to scenes of parking lots, hallways, malls, roadways, businesses and/or private residences, and/or any other suitable site, the scene classification 110 may comprise one or more of a geographic classification, an area classification, a security-type classification, a premises classification, and a room classification. For example: a geographic classification may comprise a "field", a "hill" and the like; an area classification may comprise a "park", a "playground", a "parking lot", and the like; a premises classification may comprise a "school", a "hospital", a "private home" and the like; and a room classification may comprise a "classroom", a "boardroom", a "hallway" and the like, among other possibilities.

Furthermore, in some examples, the scene classification 110 may comprise one or more time-based scene classifications. For example, the first camera 104 may be primarily dedicated to monitoring the parking lot of the site 108 at primarily one of the during the day or during the night; hence, the scene classification 110 may comprise "Parking Lot-Day" or "Parking Lot-Night".

Furthermore, while the scene classification 110 is described with respect to one value and/or setting (e.g. "Parking Lot") at the first camera 104 and/or the video analytics engine 106, the scene classification 110 may comprise a plurality of values and/or settings, such as "Parking Lot-Day" and "Parking Lot-Night", for example when the first camera 104 is to monitor the parking lot of the site 108 both during the day and the night. Put another way, the scene classification 110 may comprise more than one type and/or category of classification and/or scene classification.

The video analytics engine 106 is understood to receive images from the first camera 104 and perform any suitable video analytics on the images, for example to perform security functionality, and the like. In one example, the video analytics engine 106 may analyze images from the first camera 104 to search for given objects (e.g. which may include classifying detected objects) and the like that may represent a security incident and/or a public security incident at the site 108, such as, for example a vehicle in a parking lot of the site 108, late at night when the parking lot is normally understood to be empty. The video analytics engine 106, when finding a given object, for example, in a given time period, may generate and provide an alert of the given object, for example at a notification device (not depicted) of a business owner, a home owner, a security guard, and the like, associated with the site 108 and/or of a first responder, etc.; the video analytics engine 106 may transmit such an alert via a communication network.

As such, as depicted, the video analytics engine 106 may be initially provisioned with initial video analytics parameters 112 used to analyze the images from the first camera 104, for example to perform one or more of object recognition, object tracking, and the like, and may further define alert sensitivities, which may include conditions under which alerts are generated.

Continuing with the above example, the video analytics parameters 112 may be initially configured to search for given vehicles and/or vehicle types in images from the first camera 104 and, when the there is a vehicle in the parking lot of the site 108 in a given time period, for example 11 pm and 6 am, generate and provide an alert thereof, but only when the vehicle is in the parking lot for a given period of time, such as 15 minutes, or greater. Such time based parameters may represent alert sensitivities.

As such, the initial video analytics parameters 112 may comprise machine learning classifiers, and the like, used to search for given vehicle types in images and the initial video analytics parameters 112 may further comprise given alert sensitives. Similarly, the initial video analytics parameters 112 may further comprise parameters for tracking objects in the images from the first camera 104, for example as a vehicle moves in the site 108. Similarly, the initial video analytics parameters 112 may include geofencing parameters, and the like, to determine when a vehicle is in a given region of the parking lot of the site 108, and/or parked in a reserved parking space.

However, machine learning classifiers, time based parameters, and geofencing parameters are understood to represent only a few examples of video analytics parameters provided herein. For example, video analytics parameters provided herein may include one or more of convolutional neural network (CNN) parameters (e.g. CNN layers, for example when the video analytics engine 106 includes a CNN), machine learning classifiers, object recognition confidence thresholds, time-based parameters, object-type parameters, and size-based object parameters.

For example, the video analytics engine 106 may be used to perform object recognition using any suitable technique, and assign a confidence score when determining whether, or not an object in an image comprises a given object. Such a confidence score may be compared to an object recognition confidence threshold to determine whether, or not, the object in an image comprises the given object. In one particular example, for example when a camera is monitoring an indoor room where vehicles are not "normally" located; as such, an object recognition confidence threshold for detecting a vehicle at a site that includes an indoor room, may be set relatively high for detecting a vehicle, but relatively low for detecting humans.

Furthermore, time-based parameters, object-type parameters, and size-based object parameters may be used to determine whether certain criteria are met, or not, in determining whether, or not, to generate an alert. For example, time-based parameters may include the aforementioned alert sensitivities.

Size-based parameters may include sizes for given objects, for example, to determine whether a detected vehicle is of a size associated with vehicles. In a particular example, when a detected vehicle is not of a size associated with vehicles, such as smaller than such a size, the detected vehicle may be assigned a low confidence score, which may be used to determine that criteria for detecting a vehicle have not been met. In a more specific example, an animal, such as a squirrel, may be detected, but classified as a vehicle, and the size of the detected "vehicle" may be on the order of a size of the squirrel indicating that the detected vehicle is "too small" to be vehicle; hence, the detected "vehicle" may be assigned a low confidence score which may be used to determine that criteria for detecting a vehicle have not been met.

Object-type parameters may include any suitable parameters for detecting given objects, such as the afore mentioned machine learning classifiers and/or CNN parameters and/or layers, and the like. Furthermore, such object-type parameters may include biometric data including, but not limited to, feature vectors, facial landmarks, gait data, and the like, for detecting humans, animals, and the like.

However, the initial video analytics parameters 112 may comprise default "out of the box" video analytics parameters 112 that are initially installed at video analytics engines that receive images from cameras monitoring sites similar to the site 108. Hence the initial video analytics parameters 112 may be used to recognize and/or classify objects (e.g. object classification), and/or perform other related tasks as described herein, represented by the initial video analytics parameters 112, but may not recognize objects not represented by the initial video analytics parameters 112.

Hence, for example, the initial video analytics parameters 112 may not be used by the video analytics engine 106 to "recognize" vehicle types other than those represented by suitable object-type parameters initially configured at the video analytics parameters 112. In a particular example, where such initially represented object types include family-type cars, the video analytics engine 106 is not enabled to recognize a snow plow or a helicopter at the site 108, among other possibilities.

As depicted, the system 100 further comprises at least one second camera 114-1, 114-2 (e.g. as depicted two cameras 114-1, 114-2), associated with respective video analytics engines 116-1, 116-2, monitoring respective sites 118-1, 118-2. The second cameras 114-1, 114-2 are interchangeably referred to hereafter, collectively, as the second camera 114 and, generically, as a second camera 114. This convention will be used elsewhere in the present application. For example, the video analytics engines 116-1, 116-2 may be referred to as the video analytics engines 116 and/or as a video analytics engine 116, and the sites 118-1, 118-2 may be referred to as the sites 118 and/or as a site 118.

Like the video analytics engine 106, the video analytics engines 116 may be located with, and/or at, and/or in the respective cameras 114, and/or at one or more cloud computing devices and/or at the computing device 102 and the like. It is understood that the cameras 114 are also in fixed locations, and may have respective fixed fields-of view, or may be configured with PTZ functionality at the respective sites 118. While two second cameras 114 are depicted, the system 100 may comprise as few as one second camera 114, or more than two second cameras 114.

Furthermore, in some examples, a second camera 114 (and a respective video analytics engine 116) may have previously been installed at the site 108 (not depicted) and the first camera 104 (and the respective video analytics engine 106) may be understood to be a replacement for such a second camera 114 (and a respective video analytics engine 116); in these examples, the depicted second cameras 114 may not be currently present at the system 100, and at least one second camera of the system 100 may comprise a previous camera of the site 108, now replaced by the first camera 104.

As depicted, the sites 118 are both parking lots similar to the site 108. For example, the parking lot of the site 118-1 has various vehicles parked at the parking lot, and two overhead lights. Similarly, the parking lot of the site 118-2 has various vehicles parked at the parking lot, and one overhead light. Hence, while the sites 108, 118 are similar, but not identical, they are all understood to be parking lots.

As the sites 118 are both parking lots, respective video analytics engines 116 have generated, and/or have been provisioned with, respective scene classifications 120-1, 120-2 (e.g. scene classifications 120 and/or a scene classification 120) of a "Parking Lot". Hence, it is understood that the scene classification 110 associated with the first camera 104 is the same and/or similar to the scene classifications 120 associated with the second cameras 114. It is understood that the scene classifications 110, 120 may not be identical, but the scene classifications 110, 120 represent a same and/or similar scene classification of "Parking Lot" (e.g. the scene classifications 110, 120 may comprise different combinations of words and/or spellings thereof that denote a parking lot).

As depicted, respective video analytics parameters 122-1, 122-2 (e.g. video analytics parameters 122) are installed at the video analytics engines 116 which may be used to recognize objects in respective images from the respective second cameras 114, as well as perform any other suitable functionality described herein. However, in contrast to the video analytics parameters 112 at the video analytics engine 106 of the first camera 104, the video analytics parameters 122 at the video analytics engines 116 of the second cameras 114 are understood to be different, so that the video analytics engines 116 "recognize" more and/or fewer and/or different objects and/or have more and/or fewer and/or different alert sensitives and/or more and/or fewer and/or different object tracking parameters, and the like. For example, as depicted, a snowplow 124 is located at the site 118-1, and a helicopter is located at the site 118-2.

As depicted, the video analytics engine 116-1 is receiving feedback (e.g. "F/B") 128-1 which may comprise machine learning feedback provided by a user of the video analytics engine 116-1, to indicate that the snowplow 124 is in a given image so that a respective machine learning classifier for snowplows may be generated and stored at the video analytics parameters 122-1. Such feedback 128-1 may indicate that an alert is to be generated by the video analytics engine 116-1 when a snowplow is detected during given daytime hours, and otherwise ignored when detected during given nighttime hours, with the video analytics parameters 122-1 updated accordingly.

Similarly, as depicted, the video analytics engine 116-2 is receiving feedback (e.g. "F/B") 128-2, which may comprise a machine learning feedback provided by a user of the video analytics engine 116-1, to indicate that a helicopter is in a given image so that a respective machine learning classifier for helicopters may be generated and stored at the video analytics parameters 122-2. Such feedback 128-2 may indicate that an alert is to be generated by the video analytics engine 116-2 when a helicopter is detected regardless of time.

As such, it is understood that the video analytics engine 116-1 has been "taught" to recognize snowplows in images from the second camera 114-1 via the video analytics parameters 122-1, and the video analytics engine 116-2 has been "taught" to recognize helicopters in images from the respective second camera 114-2 via the video analytics parameters 122-2.

Such a feedback-based technique may be referred to as "teach by example" (TBE) and hence the feedback 128-1, 128-2 (e.g. feedback 128) may alternatively be referred to as teach-by-example feedback 128.

Furthermore, while the feedback 128 has been referred to as being manually generated by users, in other examples, TBE feedback engines may be used to provide the feedback 128, with such TBE feedback engines being local or remote from the video analytics engines 116 (e.g. with such TBE feedback engines being specifically configured to analyze images and provide the TBE feedback 128). Such TBE feedback engines may include, but is not limited to, a video analytics engine and/or TBE feedback engine operating at one or more cloud devices that "teach" video analytics engines 116 via the feedback 128; TBE feedback engines may include machine learning engines and/or artificial intelligence based engines in the cloud which may have more processing resources available to "learn" than the video analytics engines 116. Hence, for example, images from the second cameras 114 may be provided to such a TBE feedback engine, along with output from the respective video analytics engines 116, which may generate respective feedback 128 and provide the respective feedback to the video analytics engines 116. As will later be described, the video analytics engine 106 may be "trained" in a similar manner using user feedback and/or feedback from a TBE feedback engine, and the like.

In particular, in TBE feedback techniques, when a video analytics engine 116 (e.g. and/or the video analytics engines 1106, 136) and the like, makes a mistake (e.g. identifies a squirrel as a vehicle), TBE feedback 128 may explicitly indicate that a mistake has occurred. Based on a number of mistakes a video analytics engine 116 modifies logic used to make such decisions to avoid similar mistakes in the future. The TBE feedback 128 (indicating a mistake) may come from a user, and/or or TBE feedback 128 may come from a sophisticated algorithm at the afore mentioned TBE feedback engines; such a sophisticated algorithm may be too complex to run in real-time, but may be used to provide the TBE feedback 128 using alerts generated by the video analytics engines 116 and/or using images and/or video acquired by the cameras 114 (e.g. and/or the cameras 104, 134), and the like.

Furthermore, while the feedback 128 is described as referring to generating new video analytics parameters 122, the feedback 128 may be used to refine existing video analytics parameters 122. For example, existing video analytics parameters 122 may already include a machine learning classifier for a given vehicle type, and the feedback 128 may comprise machine learning feedback provided to a video analytics engine 116, to indicate that another vehicle of the given vehicle type is in a given image from a respective second camera 114, so that the existing machine learning classifier for the given vehicle type may be refined and/or updated and/or replaced, etc.

Similarly, a video analytics engine 116 may have generated an alert, and the like, in error, for example as compared to an intended result when the existing video analytics parameters 122 were configured. Hence, the feedback 128 may also be used to correct such errors (for example to correct and reduce false positives), for example to refine video analytics parameters 122 to generate alerts according to an intended result. Such refinement of video analytics parameters 122 may include, but is not limited to, increasing or decreasing object recognition confidence thresholds, changing time-based parameters and/or alert sensitives, and the like.

Hence, in general the feedback 128 may be used to generate any suitable new video analytics parameters 122 and/or refine any video analytics parameters 122 in any suitable manner.

As depicted, the video analytics engines 116 provide their respective video analytics parameters 122 to the computing device 102, for example when updated via the feedback 128 and/or periodically and/or on demand from the computing device 102. As depicted, the video analytics parameters 122 may be provided with the respective scene classifications 120. The computing device 102 may consolidate the video analytics parameters 122 and the scene classifications 120 and store the combined parameters 122 in a memory 130 in association with the scene classification 120 (e.g., as depicted at the memory 130 as "Parking Lot"). Associations between components in the memory 130 are represented by broken lines therebetween. Alternatively, the memory 130 may store the video analytics parameters 122 in association with respective classifications 120 on a site-by site-basis and/or camera-by-camera basis so that respective video analytics parameters 122-1, 122-2 associated with the respective cameras 114-1, 114-2 and/or the respective sites 118-1, 118-2 may be distinguished from each other at the memory 130.

The memory 130 may be a component of the computing device 102 and/or, as depicted, the memory 130 may be separate from the computing device 102. Regardless, the computing device 102 is understood to have access to the memory 130. As depicted, the memory 130 may comprise a database, and the parameters 122 may be stored at the memory 130, in association with the scene classification 120, in a database format.

Furthermore, in examples where the first camera 104 is replacing a second camera 114 previously installed at the site 108, the video analytics parameters 122 stored at the memory 130 may include the video analytics parameters 122 provided for such a previous second camera 114.

It is understood that the system 100 may comprise other cameras that may be at sites that may be different from the sites 108, 118 and hence may be classified differently than the cameras 104, 114. For example, as depicted, the system 100 comprises at least a third camera 134, and an associated video analytics engine 136, the third camera 134 at a fixed location (e.g. with a fixed field-of-view or PTZ functionality) to monitor a site 138 which, as depicted, comprises a hallway (e.g. as depicted, with a person in the hallway). As such, the video analytics engine 136 is provisioned with a scene classification 140 indicating a hallway (e.g. "Hallway"), and video analytics parameters 142 which are specific to hallways (and/or the scene classification 140). However, as the scene classification 140 is different from the classifications 110, 120, the video analytics parameters 142 are understood to be not applicable (and/or may not be applicable) to sites associated with the scene classifications 110, 120.

Similar as described with respect to the second cameras 114 and the video analytics engines 116, new video analytics parameters 142 may be generated, and/or new video analytics parameters 142 may be refined, via feedback 148 similar to the feedback 128. Furthermore, as depicted, the video analytics engine 136 provides the video analytics parameters 142 to the computing device 102 for storage at the memory 130 in association with the classification 140.

For completeness, also depicted in FIG. 1 is feedback 158 (e.g. TBE feedback 158) being received at the video analytics engine 106, which may be received before or after the video analytics parameters 112 are updated and/or changed using the video analytics parameters 122 described in more detail below.

While the video analytics engine 116, 136 are described as storing respective video analytics parameters 122, 142 at the memory 130 via the computing device 102, in other examples, one or more of the video analytics engine 116, 136 may store respective video analytics parameters 122, 142 at the memory 130 in any suitable manner (e.g. with or without the computing device 102 intervening).

In general, the computing device 102 may receive the scene classification 110 from the video analytics engine 106 (and/or otherwise determine the scene classification 110 associated with the first camera 104), and determine that the scene classification 110 is the same as, or similar to, the scene classification 120 associated with the second camera devices 114 as stored in the memory 130. As such, the computing device 102 may retrieve the video analytics parameters 122 as stored at the memory 130 in association with the scene classification 120 (e.g. in a database lookup process), and cause installation of the video analytics parameters 122 at the video analytics engine 106, for example by transmitting the video analytics parameters 122 to the video analytics engine 106 for installation. The video analytics parameters 122 may replace and/or modify the video analytics parameters 112, and/or a subset thereof, at the video analytics engine 106 and/or differences between the video analytics parameters 112, 122 may be determined and installed at the video analytics engine 106. Such differences may alternatively be determined at the computing device 102, which may receive the video analytics parameters 112, and/or an indicator thereof, from the video analytics engine 106, so that a difference between the video analytics parameters 112, 122 may be determined and transmitted to the video analytics engine 106 (e.g. to save bandwidth in the system 100).

Hence, some and/or all of the video analytics parameters 112 may be replaced and/or modified and/or changed using the video analytics parameters 122.

Hence installation of the video analytics parameters 122 may occur at the video analytics engine 106 in any suitable manner. Regardless, once the video analytics parameters 122 are installed at the video analytics engine 106, the video analytics engine 106 may "recognize" the same and/or similar objects as the other video analytics engines 116. For example, continuing with the examples from above, after installation of the video analytics parameters 122 at the video analytics engine 106, the video analytics engine 106 may "recognize" snowplows and helicopters, and similar time-based alert sensitivities for generating respective alerts thereof may be configured at the video analytics engine 106 as at the video analytics engines 116.

Furthermore, the computing device 102 may normalize the video analytics parameters 112, 122 across the cameras 104, 114 having same and/or similar scene classifications 110, 120, for example by installing one or more new and/or different and/or refined video analytics parameters 112, 122 generated at one video analytics engine 106, 116, for example based on feedback 128, across other video analytics engines 106, 116. Hence, the TBE feedback 158 may be received at the video analytics engine 106 to generate new video analytics parameters 112 and/or refine existing video analytics parameters 112, which may be installed at the video analytics engines 116.

Furthermore, changes to the video analytics parameters 112, due to installation of the video analytics parameters 122 may occur before or after any feedback 158 is received at the video analytics engine 106; furthermore, such changes made to the video analytics parameters 112 may be provided to the other video analytics engines 116 that have a same and/or similar scene classification 110, 20. For example, at the video analytics engine 106, as a result of the feedback 158, a given video analytics parameters 112 may change; when installing the video analytics parameters 122, more feedback 158 may be received to change an installed video analytics parameter 122 to be more specific to the site 108. One or more of these changes may be provided to the video analytics parameters 122 of the video analytics engines 116: in a particular example a changed video analytics parameters 122 at the video analytics engine 106 may not be provided, while a changed video analytics parameters 112 may be provided.

Furthermore, in some examples, installation of any new and/or different and/or changed video analytics parameters 112, 122 at the video analytics engines 106, 116 may occur automatically, or with user approval (e.g. using a pop-up notification, and the like, at a display screen associated with the cameras 104, 114 and/or the video analytics engines 106, 116, which may be at cameras 104, 114 and/or the video analytics engines 106, 116 and/or another device in communication with the cameras 104, 114 and/or the video analytics engines 106, 116). Similar user approval may also be requested prior to providing video analytics parameters 112, 122 from one video analytics engine 106, 116 to another video analytics engine 106, 116.

Furthermore, installation and/or sharing of the video analytics parameters 112, 122 may occur according to associated cameras 104, 114 and/or video analytics engines 106, 116. For example, the first camera 104 and one of the second cameras 114, such as the second camera 114-1, may be located at different parking lots of a same premises, and an owner thereof may wish to normalize respective video analytics parameters 112, 122-1 across respective video analytics engines 106, 116-1 at the premises. However, the other second camera 114-2, may be located at a different premises, owned by another owner, and hence may not be associated with the first camera 104 and the second camera 114-1. As such, when causing installation of the video analytics parameters 122 at the video analytics engine 106, the computing device 102 may transmit, to the video analytics engine 106, the video analytics parameters 122-1 associated with the second camera 114-1 associated with the first camera 104, but not transmit the video analytics parameters 122-2 associated with the other second camera 114-2. In such examples, the video analytics parameters 122-1, 122-2, as stored at the memory 130, may be stored separate from each other. Furthermore, associations between the cameras 104, 114, and/or video analytics engine 106, 116, and the like, may be stored at the memory 130 and generated, for example during registration processes of the video analytics engines 106, 116 at the computing device 102; for example, the cameras 104, 114, and/or video analytics engine 106, 116 may include settings that enable a common identifier therebetween to be provided, such as a street address and/or an owner's name, and the like, which may be provided to the computing device 102 in a registration process.

In yet other examples, installation and/or sharing of the video analytics parameters 112, 122 may occur automatically when the computing device 102 determines the cameras 104, 114 have similar scene classifications 120 (e.g. and a user may be prompted to confirm sharing therebetween as mentioned above).

In yet further examples, installation and/or sharing of the video analytics parameters 112, 122 may be based on any suitable rules (e.g. at the computing device 102), including, but not limited to rules based on physical distances between the cameras 104, 114. For example, installation and/or sharing of the video analytics parameters 112, 122 may occur for cameras 104, 114 with a threshold distance from each other, and the like.

Further details of components of the system 100 are next described.

The computing device 102 may comprise one or more computing devices that are remote (e.g. as depicted) and/or local to one or more of the cameras 104, 114, 134 and/or one or more of the video analytics engines 106, 116, 136 and/or one more cloud computing devices and/or other appliances, such that functionality described herein with respect to the computing device 102 may be distributed between a plurality of devices and/or engines and/or cloud computing devices and/or appliances and/or the like. Furthermore, the computing device 102 may be site specific and/or premises specific, for example communicatively coupled to cameras at a plurality of related sites and/or premises, and/or the computing device 102 may comprise a cloud computing device communicatively coupled to cameras at a plurality of unrelated sites, for example as part of a security service that monitors images and/or alerts from a camera and/or associated video analytics engine across multiple premises and/or or sites, and the like.

The cameras 104, 114, 134 may comprise any suitable digital cameras, video cameras, and the like, that acquire electronic images which may include, but are not limited to, video, video streams, and the like.

The video analytics engines 106, 116, 136 may be implemented at one or more computing devices and/or appliances and/or cloud computing devices, and the like, configured to perform the functionality as described herein based on images from respective cameras 104, 114, 134, and the like, as described herein, and such images may include, but are not limited to, video, video streams, and the like. Furthermore, functionality of the video analytics engines 106, 116, 136 may include, but is not limited to object detection and/or classification, object tracking, segmentation, motion detection, optical flow, generate alerts and the like, which may be implemented via any suitable combination of machine learning algorithms and/or CNNs.

Figure 2:
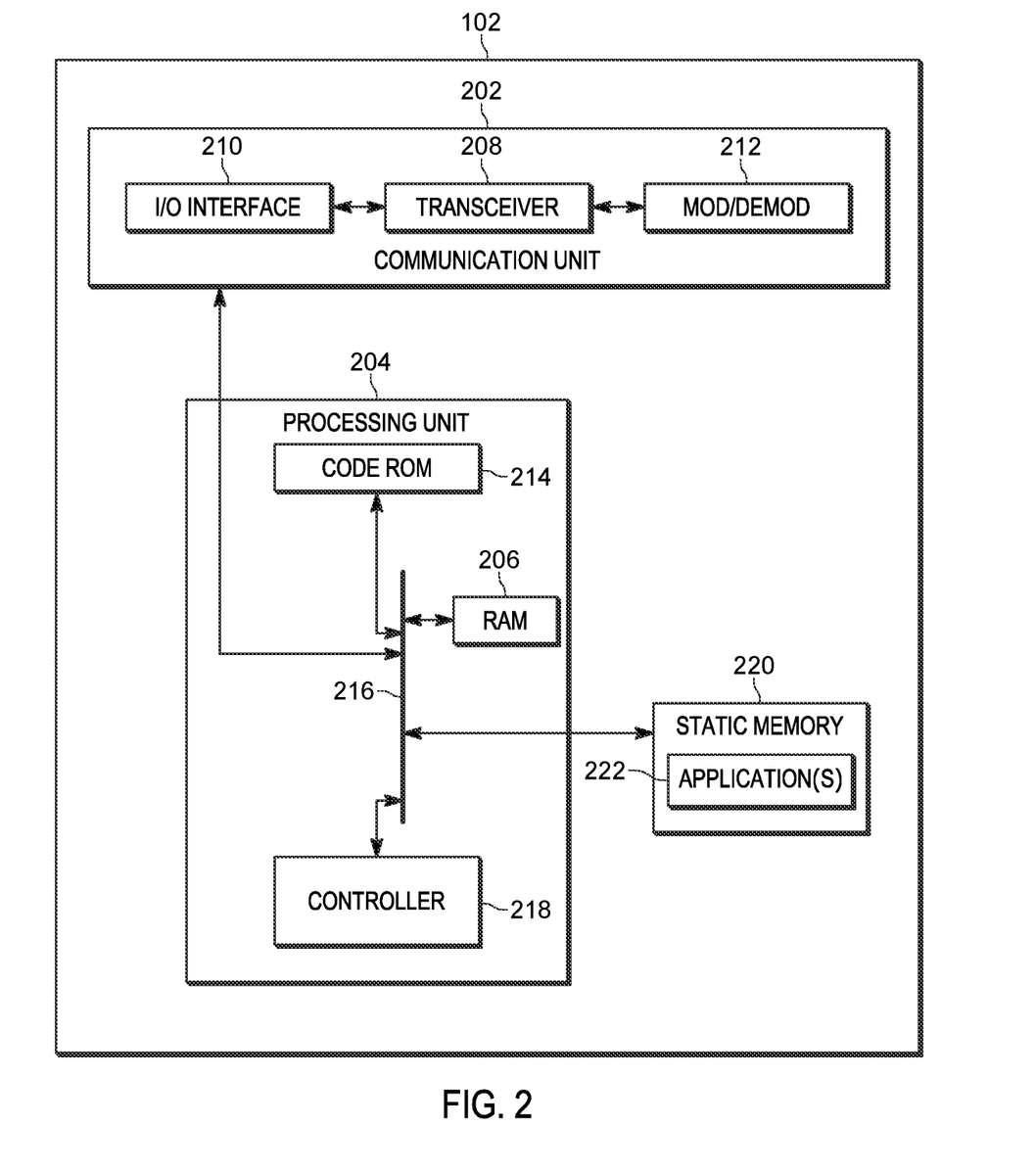
FIG. 2 is a device diagram showing a device structure of a device for installing video analytics parameters at a video analytics engine, in accordance with some examples.

Attention is next directed to FIG. 2 which depicts a schematic block diagram of an example of the computing device 102. As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g. separate RAM 206 and ROM 214), memory of the computing device 102 may have any suitable structure and/or configuration.

While not depicted, the computing device 102 may include one or more of an input device and a display screen and the like.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g. hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for installing video analytics parameters at a video analytics engine. For example, in some examples, the computing device 102 and/or the controller 218 specifically comprises a computer executable engine configured to implement functionality for installing video analytics parameters at a video analytics engine.

The static memory 220 comprises a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
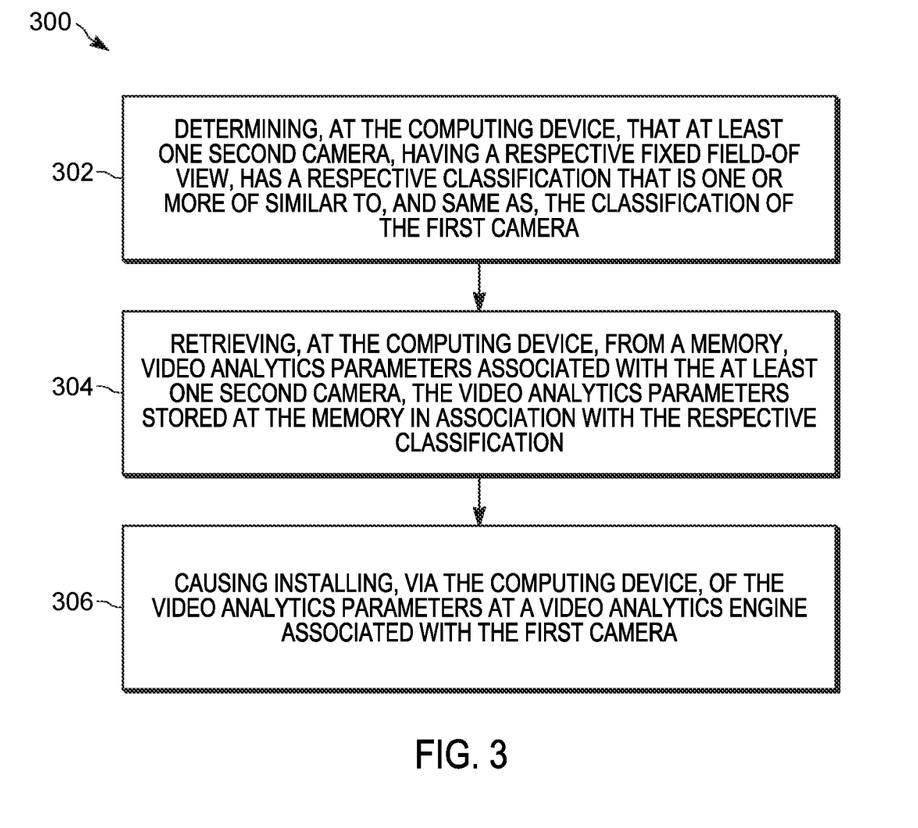
FIG. 3 is a flowchart of a method for installing video analytics parameters at a video analytics engine, in accordance with some examples.

In particular, the memory 220 stores instructions corresponding to the at least one application 222 that, when executed by the controller 218, enables the controller 218 to implement functionality for installing video analytics parameters at a video analytics engine, including but not limited to, the blocks of the methods set forth in FIG. 3.

In illustrated examples, when the controller 218 executes the one or more applications 222, the controller 218 is enabled to: determine that a classification of a first camera is one or more of similar to, and same as, a respective classification of at least one second camera; retrieve, from a memory, video analytics parameters associated with the at least one second camera, the video analytics parameters stored at the memory in association with the respective classification;
and cause installing of the video analytics parameters at a video analytics engine associated with the first camera.

The application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

While the components of the video analytics engines 106, 116, 136 are not depicted, it is understood that components of the video analytics engines 106, 116, 136 may be similar to the components of the computing device 102, but adapted for respective functionality thereof as described herein. Furthermore, functionality of the video analytics engines 106, 116, 136 may be implemented by same and/or similar machine learning algorithms as used by the computing device 102, but trained to implement one or more of object detection and/or classification, object tracking, segmentation, motion detection, optical flow, alert generation, and the like. However, functionality of the video analytics engines 106, 116, 136 may be implemented using suitable algorithms.

Attention is now directed to FIG. 3 which depicts a flowchart representative of a method 300 for installing video analytics parameters at a video analytics engine. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

It is further understood in the method 300 that the scene classification 110 of the first camera 104 has been determined in any suitable manner as described above, and that the computing device 102 has received and/or has access to the scene classification 110.

At a block 302, the controller 218 and/or the computing device 102, determines that the classification 110 of the first camera 104 is one or more of similar to, and same as, the respective classification 120 of at least one second camera 114.

For example, the controller 218 and/or the computing device 102 may compare the scene classification 110 associated with the first camera 104 with the scene classifications 120, 140 stored at the memory 130, for example in a database lookup, and the like, and determine that a respective classification 120 of the second cameras 114 is similar to, or same as, the scene classification 110 of the first camera 104. However, as the respective classification 140 of the third camera 134 is different from the scene classification 110 of the first camera 104, the respective classification 140 of the third camera 134 may be ignored.

At a block 304, the controller 218 and/or the computing device 102, retrieves, from the memory 130, the video analytics parameters 122 associated with the at least one second camera 114, the video analytics parameters 122 stored at the memory 130 in association with the respective classification 120. However, as the respective classification 140 of the third camera 134 is different from the scene classification 110 of the first camera 104, the respective video analytics parameters 142 of the third camera 134 may be ignored and/or not retrieved.

As has already been described, in some examples, the controller 218 and/or the computing device 102, may retrieve, from the memory 130, the video analytics parameters 122 associated with the at least one second camera 114 that is associated with the first camera 104 and ignore video analytics parameters 122 associated with second cameras 114 that are not associated with the first camera 104.

Furthermore, in examples where a second camera 114 (and a respective video analytics engine 116) of the system 100 may have previously been installed at the site 108, and the first camera 104 (and the respective video analytics engine 106) is understood to be a replacement therefor, the video analytics parameters 122 retrieved from the memory 130 may be from such a previous second camera 114.

At a block 306, the controller 218 and/or the computing device 102, causes installing of the video analytics parameters 122 at the video analytics engine 106 associated with the first camera 104. For example, as has already been described, the controller 218 and/or the computing device 102 may transmit the video analytics parameters 122, and/or a difference between the video analytics parameters 112, 122 to the video analytics engine 106 for installation.

Hence, in examples where the computing device 102 comprises one or more cloud computing devices and the video analytics engine 106 is located at the first camera 104, installing the video analytics parameters 122 at the video analytics engine 106 occurs using a network and/or a communication link between the computing device and the video analytics engine 106.

However, in the examples where the computing device 102 comprises the video analytics engine 106, installing the video analytics parameters 122 at the video analytics engine 106 may occur locally.

It is understood that "installation" and/or "installing" of video analytics parameters as used herein may include storing the video analytics parameters 122 at the video analytics engine 106 and/or at a memory thereof for use by machine learning algorithms and/or CNNs at the video analytics engine 106. In some examples, as has already been described some video analytics parameters 112 may be replaced with particular the video analytics parameters 122, or the video analytics parameters 122 may replace all the video analytics parameters 112; however, installation may occur in any suitable manner.

Regardless, when the video analytics parameters 122 are installed at the video analytics engine 106, the video analytics engine 106 may "recognize" the same and/or similar objects as the other video analytics engines 116 and generate alerts in a similar manner as the other video analytics engines 116.

Furthermore, in examples where a second camera 114 (and a respective video analytics engine 116) of the system 100 may have previously been installed at the site 108, and the first camera 104 (and the respective video analytics engine 106) is understood to be a replacement therefor, the video analytics parameters 122 installed at the video analytics engine 106, as retrieved from the memory 130, may cause the video analytics parameters 122 of the previous second camera to persist at the site 108, for example by virtue of being installed, and the like, at the video analytics engine 106.

Furthermore, exchange of the video analytics parameters 112, 122 between the video analytics engine 106 may occur on an on-going basis, with new and/or refined video analytics parameters 112 at the video analytics engine 106 installed at the other video analytics engines 116, and new and/or refined video analytics parameters 122 at the other video analytics engines 116 installed at the video analytics engine 106.

Hence, for example, the method 300 may further comprise the controller 218 and/or the computing device 102: receiving, from the video analytics engine 106, after installing the video analytics parameters 122 at the video analytics engine 106, refined and/or new video analytics parameters 112; storing the refined and/or new video analytics parameters 112 in association with the scene classification 110 (and/or the scene classification 120) of the first camera 104 for sharing with one or more of: at least one second camera 114; and newly installed cameras having a respective classification 120 that is one or more of similar to, and the same as, the scene classification 110 of the first camera 104.

Indeed, such an example illustrates that the video analytics engine 106 may receive feedback 128 and/or TBE feedback to refine and/or generate new video analytics parameters 112, which are shared with the second cameras 114 and/or cameras that newly register with the computing device 102 a classification that is the same, and/or similar to, the scene classification(s) 110, 120.

Similarly, the method 300 may further comprise the controller 218 and/or the computing device 102: determining, after installation of the video analytics parameters 122 occurs at the video analytics engine 106, that refined and/or new video analytics parameters 122, associated with the at least one second camera 114, have been stored at the memory 130; and causing installing of the refined and/or new video analytics parameters 122 at the video analytics engine 106 associated with the first camera 104. Hence, as feedback 128 continues to be received at the video analytics engine 116, refined and/or new video analytics parameters 122 are again shared with the video analytics engine 106.

Figure 4:
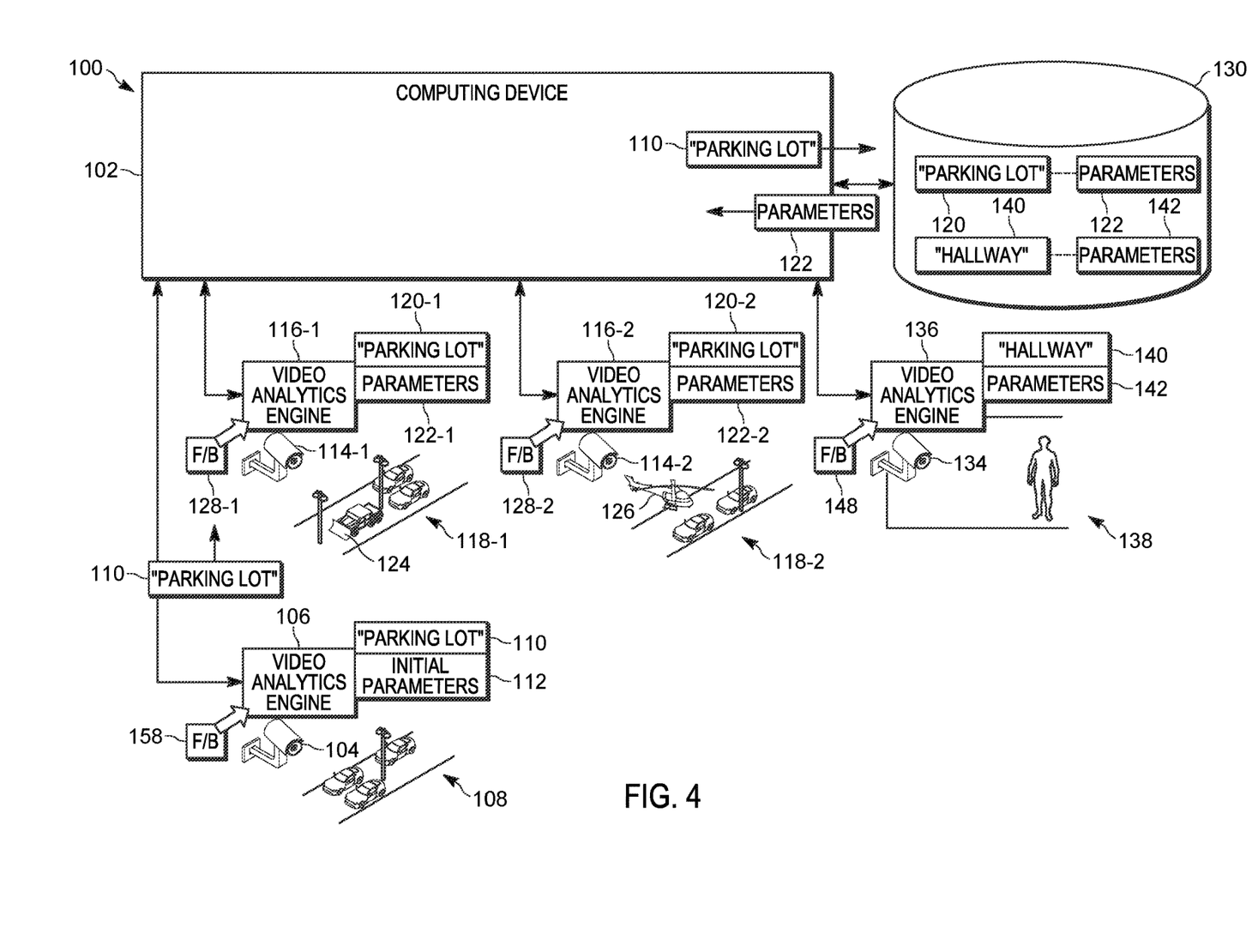
FIG. 4 depicts the system of FIG. 1 implementing a method for installing video analytics parameters at a video analytics engine, in accordance with some examples.
Figure 5:
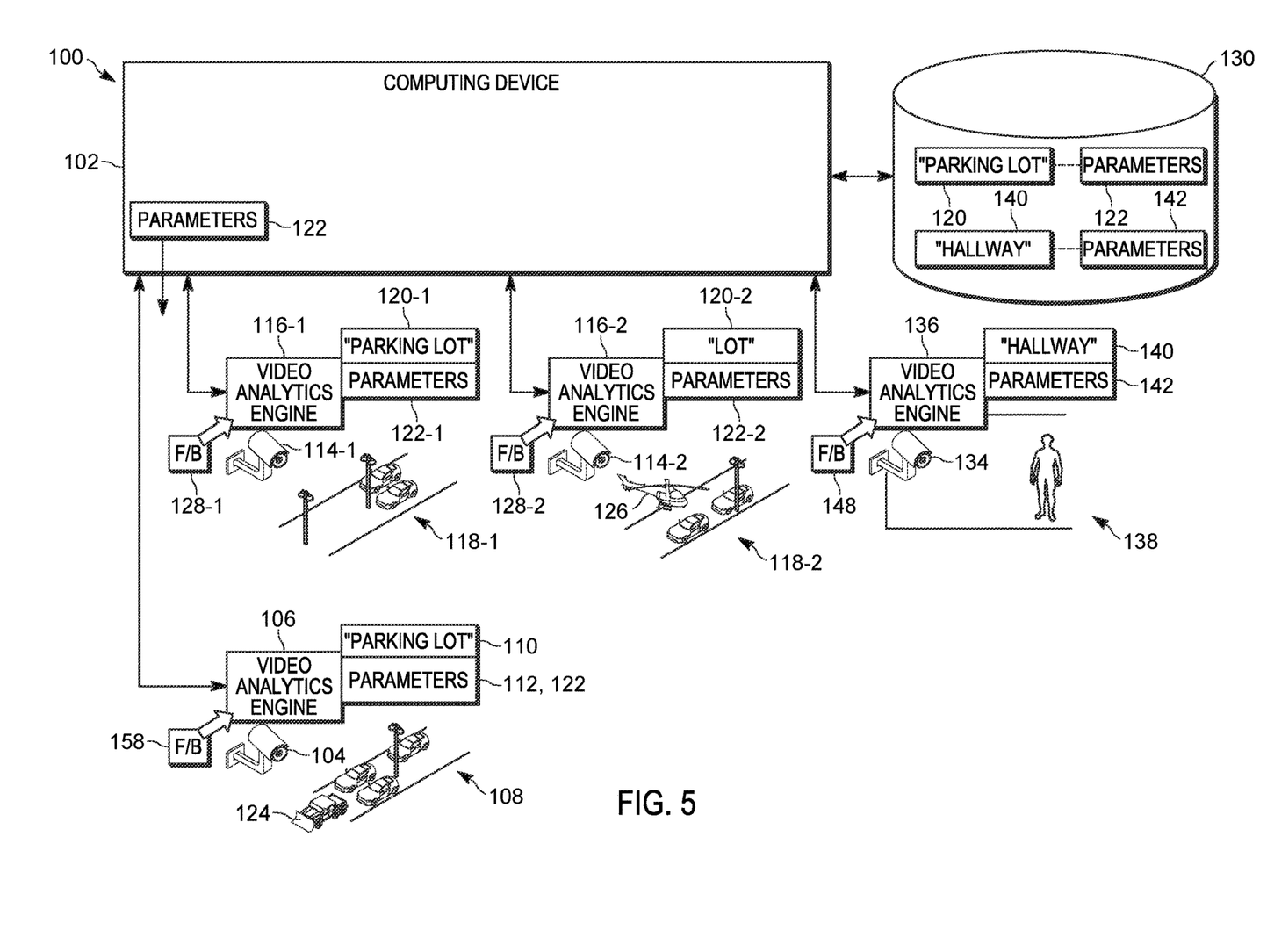
FIG. 5 depicts the system of FIG. 1 continuing to implement the method for installing video analytics parameters at a video analytics engine, in accordance with some examples.

Attention is next directed to FIG. 4 and FIG. 5 which depict an example of the method 300. FIG. 4 and FIG. 5 are similar to FIG. 1, with like components having like numbers.

With attention directed to FIG. 4, the computing device 102 determines the scene classification 110 of the first camera 104 by receiving the scene classification 110 from the video analytics engine 106, for example in a registration process. The computing device 102 determines (e.g. at the block 302 of the method 300) that the scene classification 110 of the first camera 104 is similar to, and/or the same as, the respective classification 120 of the at least one second camera 114, for example by using the scene classification 110 in a database lookup, and the like, at the memory 130. In conjunction with such a database lookup, and the like, the computing device 102 retrieves (e.g. at the block 304 of the method 300) the video analytics parameters 122 associated with the at least one second camera 114.

With attention directed to FIG. 5, the computing device 102 causes installation (e.g. at the block 306 of the method 300) of the video analytics parameters 122 at the video analytics engine 106 by transmitting the video analytics parameters 122 to the video analytics engine 106. Hence, as depicted, the video analytics parameters 112, 122 are combined at the video analytics engine 106 such that, as depicted, the video analytics engine 106 may recognize the snowplow 124 (e.g. and/or the helicopter 126). While both sets of video analytics parameters 112, 122 are depicted at the video analytics engine 106, it is understood that the video analytics parameters 112, 122 are combined into one set of video analytics parameters, and both sets of video analytics parameters 112, 122 are shown merely to indicate that some video analytics parameters 122 may be "new" at the video analytics engine 106, while some of the video analytics parameters 112 may persist at the video analytics engine 106.

Other examples are within the scope of the present specification. For example, video analytics parameters 112, 122 may also be shared in a peer-to-peer scheme in which, for example, the video analytics engines 106, 116 register with each other and determine they have similar and/or a same scene classification 110, 120. As such, when changes occur to video analytics parameters 112, 122 at one video analytics engine 106, 116, such changes may be shared with the other video analytics engines 106, 116 (e.g. automatically and/or with user approval).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and installing video analytics parameters at a video analytics engine, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    determining, at a computing device, a scene classification of a first camera based on classifying one or more objects identified in images generated by the first camera to identify a type of site at which the first camera is installed;
    determining, at the computing device, that the scene classification of the first camera is one or more of similar to, and same as, a respective scene classification of at least one second camera;
    retrieving, at the computing device, from a memory, video analytics parameters installed at a respective video analytics engine associated with the at least one second camera, the video analytics parameters stored at the memory in association with the respective scene classification, wherein the video analytics parameters comprise one or more of convolutional neural network (CNN) parameters, machine learning classifiers, object recognition confidence thresholds, time-based parameters, object-type parameters, and size-based object parameters;
    causing installing, via the computing device, of the video analytics parameters at a video analytics engine associated with the first camera; and
    receiving, via the computing device, after installing the video analytics parameters at the video analytics engine associated with the first camera, new or refined video analytics parameters associated with the scene classification or the respective scene classification;
    when the new or refined video analytics parameters are received from, and generated by, the video analytics engine associated with the first camera, sharing, via the computing device, the new or refined video analytics parameters with the respective video analytics engine associated with the at least one second camera or further respective video analytics engines associated with newly installed cameras having the respective scene classification, for installation thereat; and
    when the new or refined video analytics parameters are received from the memory, causing installing the new or refined video analytics parameters at the video analytics engine associated with the first camera, the new or refined video analytics parameters received from the memory generated by the respective video analytics engine or the further respective video analytics engines.

2. The method of claim 1, wherein the scene classification is based on a setting at one or more of the first camera and the video analytics engine.

3. The method of claim 1, wherein the scene classification comprises one or more of a geographic classification, an area classification, a security-type classification, a premises classification, and a room classification.

4. The method of claim 1, wherein the scene classification comprises one or more time-based classifications.

5. The method of claim 1, wherein sharing the new or refined video analytics parameters, as received from the video analytics engine associated with the first camera, comprises:
    storing, via the computing device, at the memory, the new or refined video analytics parameters in association with the scene classification of the first camera for sharing with one or more of: the respective video analytics engine associated with the at least one second camera; and the further respective video analytics engines associated with the newly installed cameras.

6. The method of claim 1, wherein the refined video analytics parameters are generated using teach-by-example feedback.

7. The method of claim 1, wherein causing installing of the new or refined video analytics parameters at the video analytics engine associated with the first camera comprises:
    determining, at the computing device, after installation of the video analytics parameters occurs at the video analytics engine, that the new or refined video analytics parameters have been stored at the memory; and
    causing installing, via the computing device, of the new or refined video analytics parameters at the video analytics engine associated with the first camera.

8. The method of claim 1, wherein the computing device comprises one or more cloud computing devices and the video analytics engine is located at the first camera such that installing the video analytics parameters at the video analytics engine occurs using a network.

9. A device comprising:
    a controller configured to:
        determine a scene classification of a first camera based on classifying one or more objects identified in images generated by the first camera to identify a type of site at which the first camera is installed;
        determine that the scene classification of the first camera is one or more of similar to, and same as, a respective scene classification of at least one second camera;
        retrieve, from a memory, video analytics parameters installed at a respective video analytics engine associated with the at least one second camera, the video analytics parameters stored at the memory in association with the respective classification, wherein the video analytics parameters comprise one or more of convolutional neural network (CNN) parameters, machine learning classifiers, object recognition confidence thresholds, time-based parameters, object-type parameters, and size-based object parameters;
cause installing of the video analytics parameters at a video analytics engine associated with the first camera; and
receive, after installing the video analytics parameters at the video analytics engine associated with the first camera, new or refined video analytics parameters associated with the scene classification or the respective scene classification;
when the new or refined video analytics parameters are generated by, and received from, the video analytics engine associated with the first camera, share the new or refined video analytics parameters with the respective video analytics engine associated with the at least one second camera or further respective video analytics engines associated with newly installed cameras having the respective scene classification, for installation thereat; and
when the new or refined video analytics parameters are received from the memory, cause installing the new or refined video analytics parameters at the video analytics engine associated with the first camera, the new or refined video analytics parameters received from the memory generated by the respective video analytics engine or the further respective video analytics engines.

10. The device of claim 9, wherein the scene classification is based on a setting at one or more of the first camera and the video analytics engine.

11. The device of claim 9, wherein the scene classification comprises one or more of a geographic classification, an area classification, a security-type classification, a premises classification, and a room classification.

12. The device of claim 9, wherein the scene classification comprises one or more time-based classifications.

13. The device of claim 9, wherein the controller is further configured to share the new or refined video analytics parameters, as received from the video analytics engine associated with the first camera by:
storing, at the memory, the new or refined video analytics parameters in association with the scene classification of the first camera for sharing with one or more of: the respective video analytics engine associated with the at least one second camera; and the further respective video analytics engines associated with the newly installed cameras.

14. The device of claim 9, wherein the refined video analytics parameters are generated using teach-by-example feedback.

15. The device of claim 9, wherein the controller is further configured to cause installing of the new or refined video analytics parameters at the video analytics engine associated with the first camera by:
determining, after installation of the video analytics parameters occurs at the video analytics engine, that the new or refined video analytics parameters, installed at the respective video analytics engine, have been stored at the memory; and
cause installing of the one or more of the new video analytics parameters and the refined video analytics parameters at the video analytics engine associated with the first camera.

16. The device of claim 9, further comprising one or more cloud computing devices and the video analytics engine is located at the first camera such that installing the video analytics parameters at the video analytics engine occurs using a network.

* * * * *